United States Patent [19]

Kiliany et al.

[11] Patent Number: 5,512,260
[45] Date of Patent: Apr. 30, 1996

[54] REDUCTION OF SULFUR CONTENT IN A GASEOUS STREAM

[75] Inventors: Thomas R. Kiliany, West Chester, Pa.; John P. McWilliams, Woodbury; David A. Pappal, Haddonfield, both of N.J.

[73] Assignee: Mobil Oil Corporation, Fairfax, Va.

[21] Appl. No.: 205,436

[22] Filed: Mar. 4, 1994

[51] Int. Cl.⁶ .......................... B01D 53/48; B01D 53/86
[52] U.S. Cl. .................. 423/242.1; 423/244.04; 423/244.10; 423/244.11; 423/230; 423/573.1; 423/576; 423/576.8
[58] Field of Search .............. 423/242.1, 244.04, 423/244.10, 244.11, 573.1, 576, 230, 576.8

[56] References Cited

U.S. PATENT DOCUMENTS

| | | | |
|---|---|---|---|
| 3,531,917 | 10/1970 | Grunewald et al. | 55/42 |
| 3,717,699 | 2/1973 | Nicklin et al. | 423/576 |
| 3,798,315 | 3/1974 | Nicklin | 423/547 |
| 3,864,452 | 2/1975 | Chi et al. | 423/244 |
| 3,978,004 | 8/1976 | Daumas et al. | 252/462 |
| 4,082,146 | 4/1978 | Compton et al. | 166/259 |
| 4,097,585 | 6/1978 | Fischer | 423/574 R |
| 4,150,104 | 4/1979 | Herpers et al. | 423/224 |
| 4,279,882 | 7/1981 | Beavon | 423/574 |
| 4,311,683 | 1/1982 | Hass et al. | 423/573 G |
| 4,332,781 | 6/1982 | Lieder et al. | 423/573 G |
| 4,508,699 | 4/1985 | Schoofs | 423/574 |
| 4,552,746 | 11/1985 | Kettner et al. | 423/573 |
| 4,576,814 | 3/1986 | Hass et al. | 423/573 G |
| 4,608,363 | 8/1986 | Goodboy | 502/330 |
| 4,636,371 | 1/1987 | Farha, Jr. | 423/244 |
| 4,673,557 | 6/1987 | Nieskens et al. | 423/230 |
| 4,725,415 | 2/1988 | Kidd | 423/230 |
| 4,818,740 | 4/1989 | Berben et al. | 502/313 |
| 4,857,297 | 8/1989 | Kettner et al. | 423/576 |
| 4,886,649 | 12/1989 | Ismagiloy et al. | 423/230 |
| 4,981,661 | 1/1991 | Borsboom et al. | 423/244 |
| 5,037,629 | 8/1991 | Berben et al. | 423/576.8 |
| 5,057,473 | 10/1991 | Voecks et al. | 502/73 |
| 5,077,031 | 12/1991 | Kvasnikoff et al. | 423/574 |
| 5,106,607 | 4/1992 | Chopin et al. | 423/564 |

FOREIGN PATENT DOCUMENTS 722113  11/1965  Canada ................. 423/576.8

OTHER PUBLICATIONS

Kettner et al., Oil & Gas Journal, New Claus Tail–gas Process Proved in Germany, Jan. 11, 1988, pp. 63–66.

Primary Examiner—Gary P. Straub
Assistant Examiner—Timothy C. Vanoy
Attorney, Agent, or Firm—A. J. McKillop; D. P. Santini; G. L. Harris

[57] ABSTRACT

A process for reducing sulfur content in a gaseous stream with the production of elemental sulfur by first treating the gaseous steam with hydrogenation and hydrolysis to convert substantially all of the sulfur components therein to hydrogen sulfide. Then reducing the water content of the gaseous stream to optimize chemical equilibrium. Thereafter, the gaseous steam is contacted in an oxidation reactor with an acid catalyst at a temperature of about 150° C. to about 350° C. to convert hydrogen sulfide to elemental sulfur. The product gas leaving the oxidation reactor is cooled to separate elemental sulfur by condensation. The acid catalyst is a shape selective zeolite, a metal-exchanged or impregnated alumina, or a mixture thereof. The alumina is gamma phase alumina impregnated with from about 0.2 wt % to about 2.0 wt % metal.

17 Claims, 9 Drawing Sheets

FIG. 1C HYDROGENATION STAGE

FIG. 2 — DIRECT OXIDATION 0.2% Ni ON ALUMINA

FIG. 3 — DIRECT OXIDATION 1.0% Ni ON ALUMINA

FIG. 4 DIRECT OXIDATION 2.0% Ni ON ALUMINA

FIG. 5 DIRECT OXIDATION 65% HZSM-5/35% ALUMINA

FIG. 6 DIRECT OXIDATION
1.0% Ni ON 65% ZSM-5/35% ALUMINA

FIG. 7 DIRECT OXIDATION
1.0% Ni 65% MCM-22/35% ALUMINA

REDUCTION OF SULFUR CONTENT IN A GASEOUS STREAM

BACKGROUND OF THE INVENTION

The present invention relates to a process of reducing sulfur content of a gaseous stream. More particularly, the present invention relates to a process of reducing hydrogen sulfide in a gaseous stream with the production of elemental sulfur.

The removal of sulfur components, particularly hydrogen sulfide, from gaseous streams such as the waste gases generated in the course of various chemical and industrial processes, for example, in the pulping of wood, in the production of natural gas and crude oil and in petroleum refining, has become increasingly important in combating atmospheric pollution. Gases containing sulfurs, particularly hydrogen sulfide, not only have an offensive odor, but such gases may also cause damage to vegetation, painted surfaces, and wild life as well as raising a significant health hazard to humans. Governmental regulations have increasingly imposed lower tolerances on the sulfur content of gases which can be vented to the atmosphere, and it is now imperative in many localities to remove virtually all the sulfurs, particularly hydrogen sulfide.

Natural gas is a mixture of several gaseous components, the percentages of which may vary widely from one reservoir to another. The principal energy median in natural gas are hydrocarbons, with methane usually making up the largest percentage. Natural gas also contains a lesser quantity of higher hydrocarbons, such as ethane and propane, and it almost always contains some non-combustible constituents such as carbon dioxide, nitrogen, and traces of rare gases.

Some natural gases also contain hydrogen sulfide. Gas which has a hydrogen sulfide content of less than 1% is called "lean sour gas"; gas which has more is called "sour gas". Gas that does not contain any hydrogen sulfide is known as "sweet gas".

Production of sour gas reservoirs requires carefully specified process equipment, and techniques, as well subsequent purification treatment. Due to the hydrogen sulfide content in the untreated gas, strict safety precautions must be observed in transportation and processing of sour gas. Sour gas is highly corrosive, and therefore also requires the use of high-grade materials. Hydrogen sulfide is removed from natural gas in processing plants which require extremely high capital outlay on the part of the natural gas producers, plus special know-how to handle the sophisticated process technology.

Natural gas production and petroleum refinery streams are typically desulfurized by the Claus process wherein elemental sulfur is produced by reacting hydrogen sulfide and sulfur dioxide in the presence of a catalyst. The Claus process uses a combustion furnace or chamber which, at 950° C. to 1,350° C. (1742° F.–2462° F.) converts 50 to 70% of sulfur contained in the feed gas into elemental sulfur. Sulfur is condensed by cooling the reaction gas to a temperature below the dew point of sulfur. Thereafter the remaining gas is heated and fed to a claus reactor where the gas is reacted over a catalyst to form elemental sulfur. Typically, the gas passes through at least two such Claus catalyst stages.

The different stages of the Claus process may be represented by the following equations.

$$H_2S + 3/2 O_2 \rightarrow SO_2 + H_2O \quad \text{(Eq.I)}$$

$$2H_2S + SO_2 \leftrightarrows 3S + 2H_2O \quad \text{(Eq.II)}$$

The overall reaction is:

$$3H_2S + 3/2 O_2 \leftrightarrows 3S + 3H_2O \quad \text{(Eq.III)}$$

The final Claus exhaust gas still contains small amounts of $H_2S$, $SO_2$, $CS_2$, carbon oxysulfide, CO, and elemental sulfur in the form of a vapor or mist. The exhaust gas generally is subjected to post-combustion to convert substantially all the sulfurs to $SO_2$ and then further purified by Claus after-treatments. Such after-treatment is carried out either directly after the last catalytic process stage or before the post-combustion, depending on the type of process. These additional after-treatment installations are generally complicated and expensive with regard to apparatus and process technology due to the diversity of the sulfur compounds occurring in the Claus exhaust gas.

U.S. Pat. Nos. 4,552,746 and 4,857,297 disclose the use of titanium oxide for the direct catalytic oxidation of hydrogen sulfide in gas mixtures with air or oxygen into elemental sulfur and water. These titanium oxide catalysts require that the feed have water constraints, for example that the water content be less than 10 volume percent.

It is an object of the present invention to provide a direct catalytic oxidation process having substantially improved conversion, and water tolerance.

SUMMARY OF THE INVENTION

In accordance with the present invention there is provided a process for reducing sulfur content in a gaseous stream with the production of elemental sulfur comprising the steps of treating the gaseous steam by hydrogenation and hydrolysis to convert substantially all of the sulfur components therein to hydrogen sulfide. Thereafter, the gaseous steam is contacted in an oxidation reactor with an acid catalyst at a temperature of about 150° C. (302° F.) to about 350° C. (662° F.) to convert hydrogen sulfide to elemental sulfur. The acid catalyst is a shape selective zeolite, a metal-exchanged or impregnated alumina or a mixture thereof. The product gas leaving the oxidation reactor is cooled to separate elemental sulfur by condensation.

The catalyst of the present invention is significantly more water tolerant than titanium oxide catalyst. However, minimizing water in the feed serves to enhance the thermodynamics of the reaction. Further, the reaction temperature range of the present invention is lower than that when using titanium oxide.

In accordance with a specific aspect of the invention, the acidic catalyst is a zeolite having a structure of ZSM-5, ZSM-11, ZSM-12, ZSM-22, ZSM-23, ZSM-35, ZSM-48, MCM-22, MCM-36, MCM-49, zeolite Y, zeolite beta or mixtures thereof.

In accordance with another specific aspect of the invention, the alumina is gamma phase alumina impregnated with from about 0.2 to about 2.0 wt % metal.

In accordance with yet another specific aspect of the invention, the oxidation reactor is maintained at a relatively low pressure of from about 0.0 psig to about 300 psig.

BRIEF DESCRIPTION OF THE DRAWING

FIG. 1(A) to FIG. 1(C) shows a Claus plant and a Claus tail-gas desulfurizing system using the process of the present invention;

DESCRIPTION OF SPECIFIC EMBODIMENTS

Figure 1A:
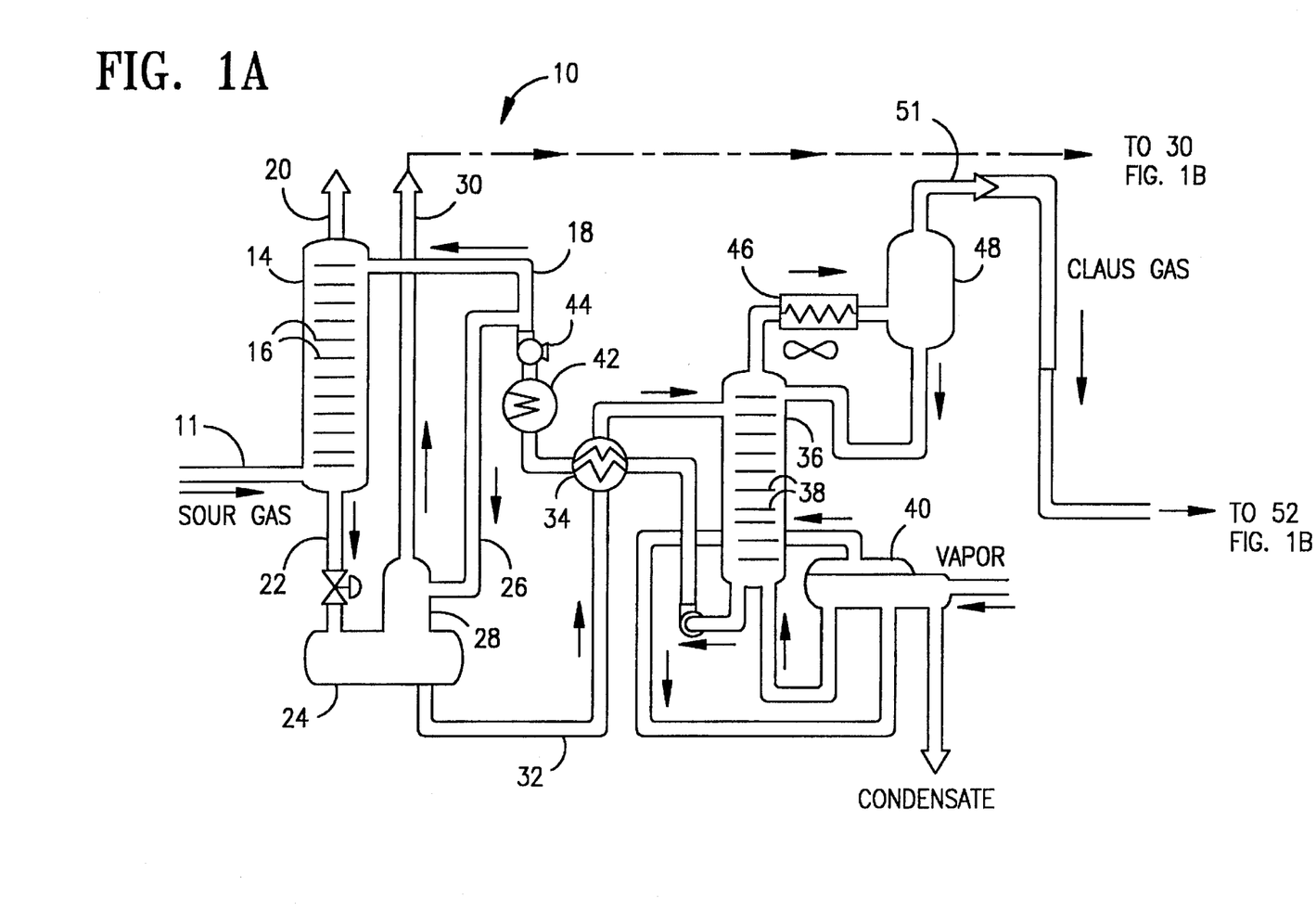
Figure 1B:
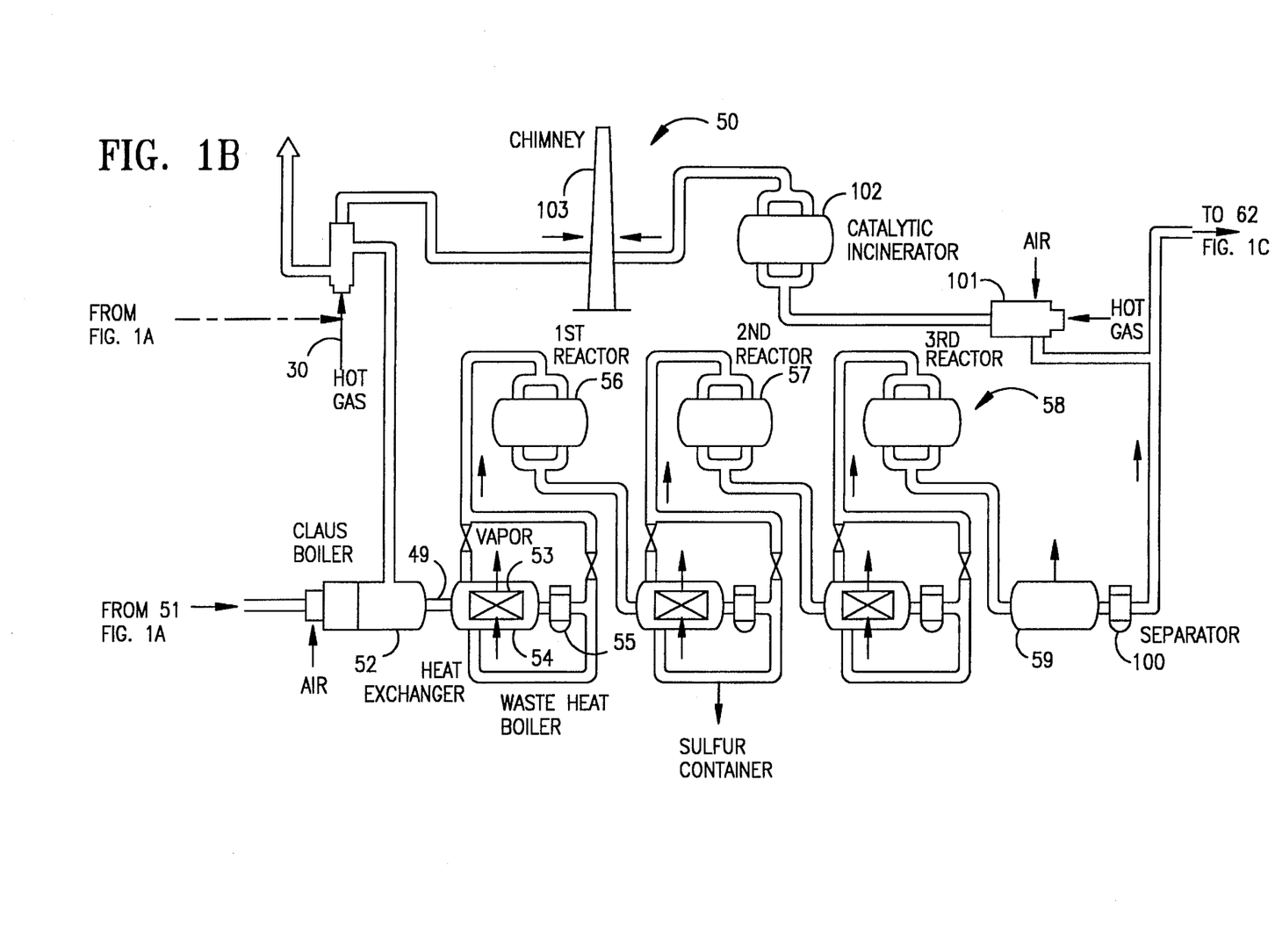
Figure 1C:
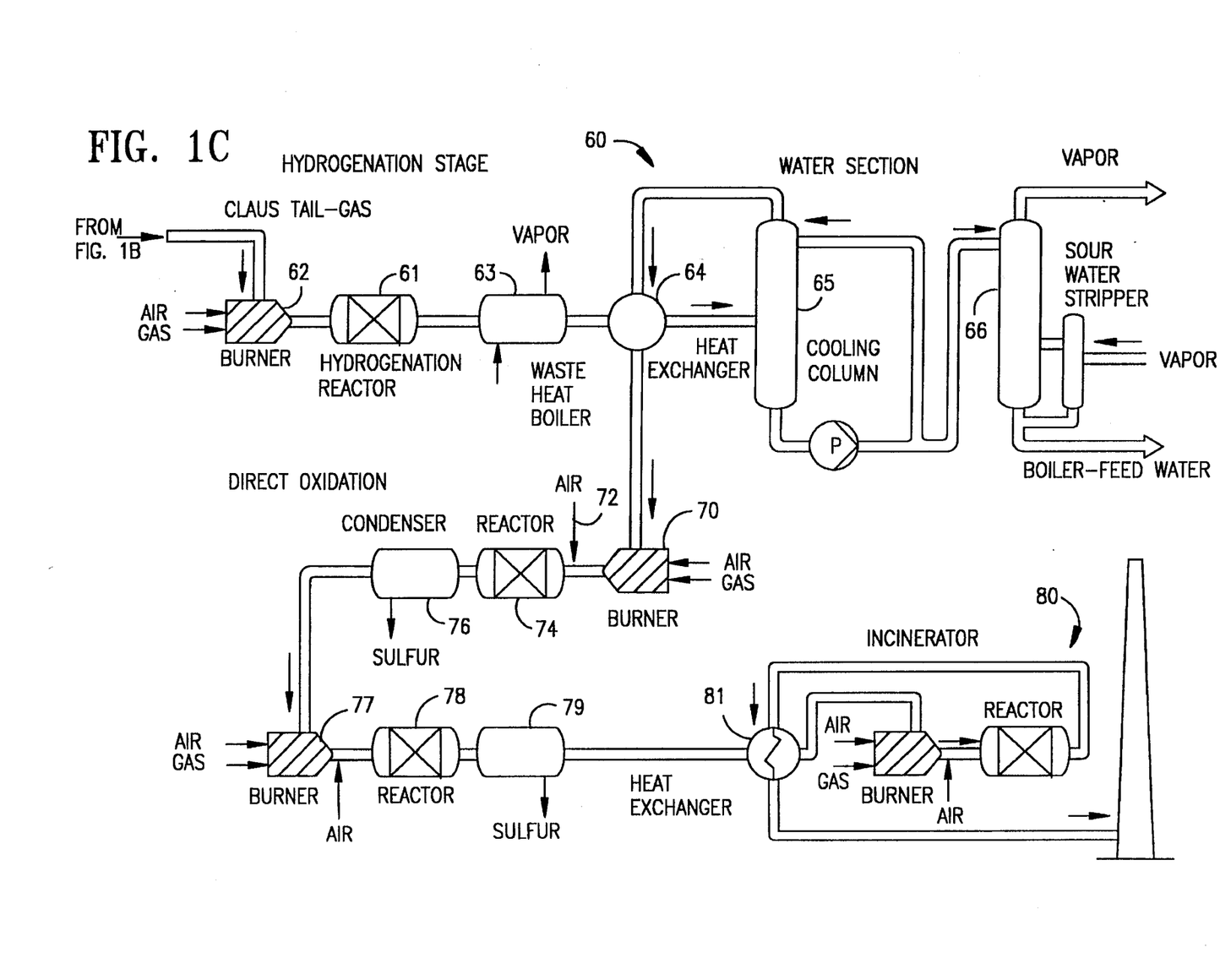
Figure 2:
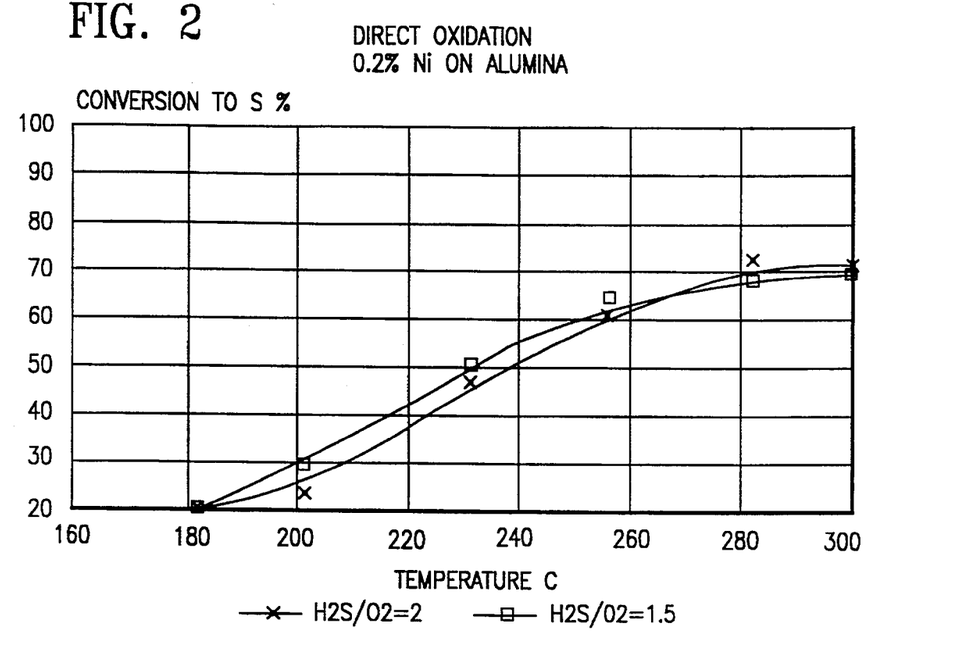
FIG. 2 is a graph of test data for a 0.2% Ni on alumina catalyst for direct oxidation of hydrogen sulfide with air to elemental sulfur.
Figure 3:
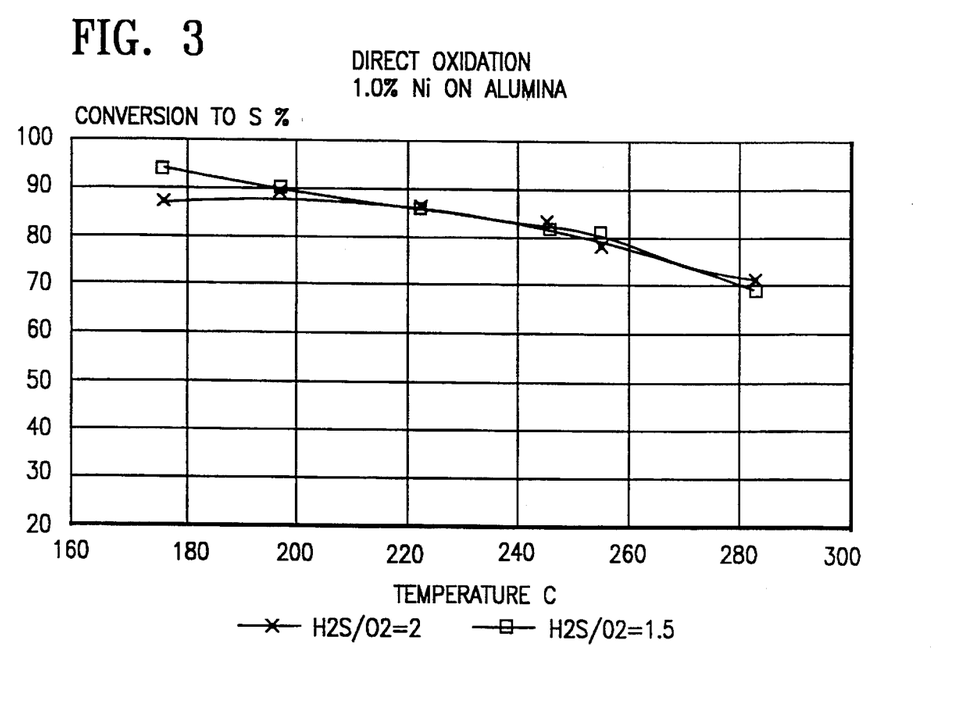
FIG. 3 is a graph of test data for a 1.0% Ni on alumina catalyst for direct oxidation of hydrogen sulfide.
Figure 4:
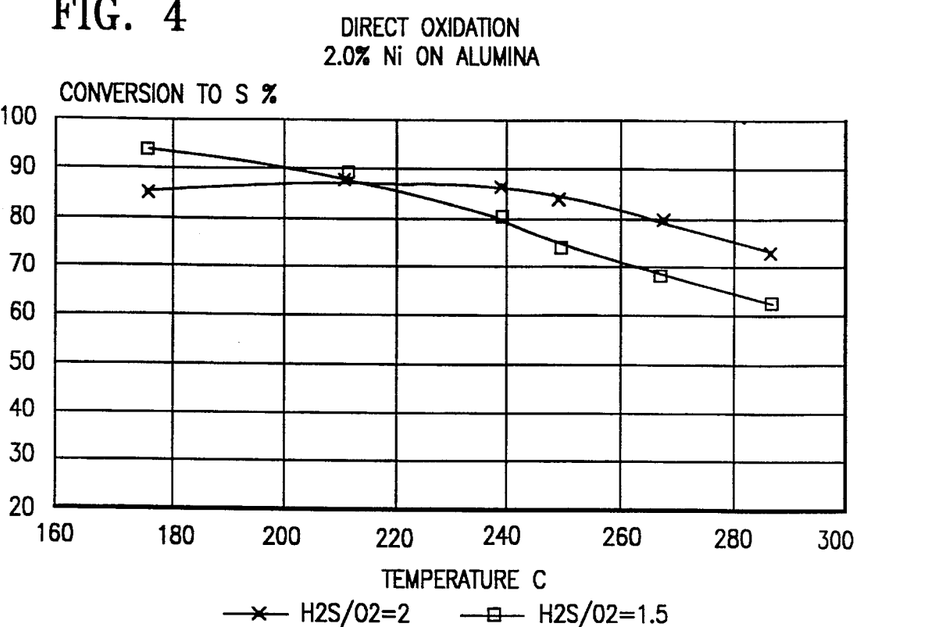
FIG. 4 is a graph of test data for a 2.0% Ni on alumina catalyst for direct oxidation of hydrogen sulfide.
Figure 5:
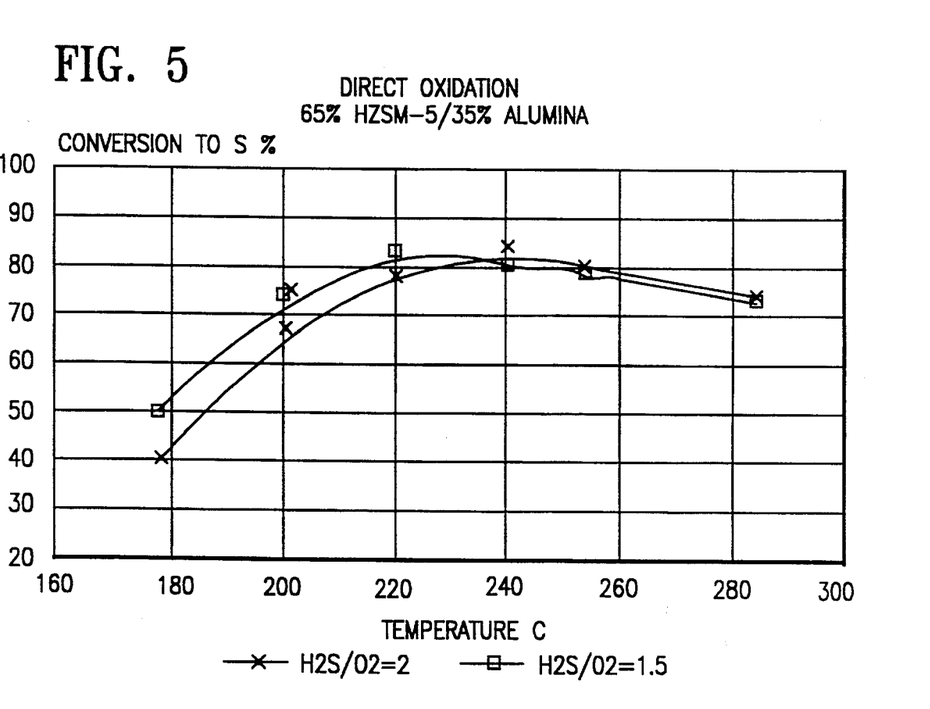
FIG. 5 is a graph of test data for a 65% HZSM-5/35% alumina catalyst for direct oxidation of hydrogen sulfide.
Figure 6:
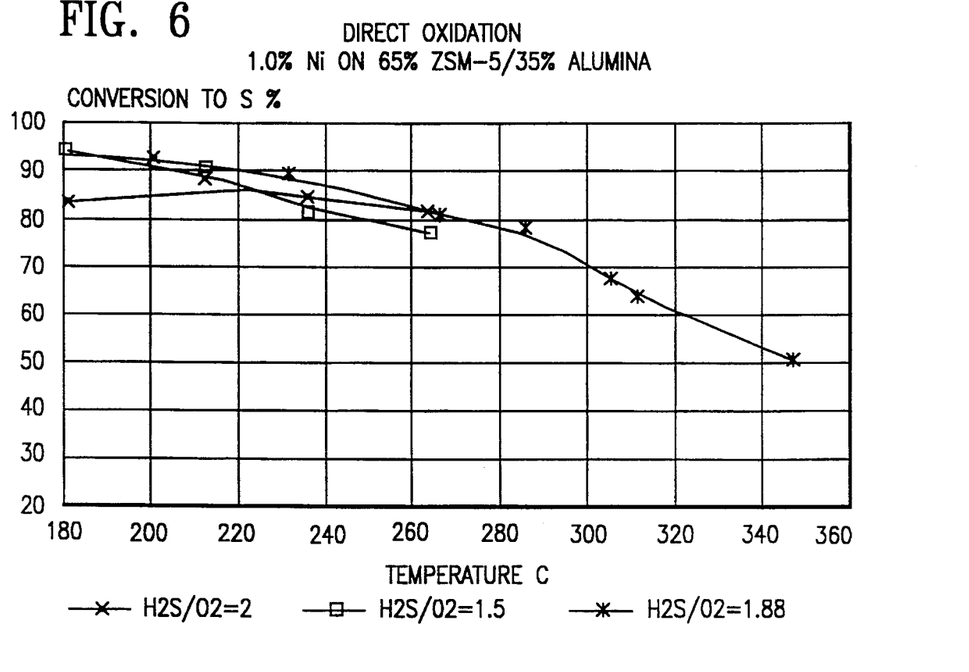
FIG. 6 is a graph of test data for a 1.0% Ni on 65% HZSM-5/35% alumina catalyst for direct oxidation of hydrogen sulfide.
Figure 7:
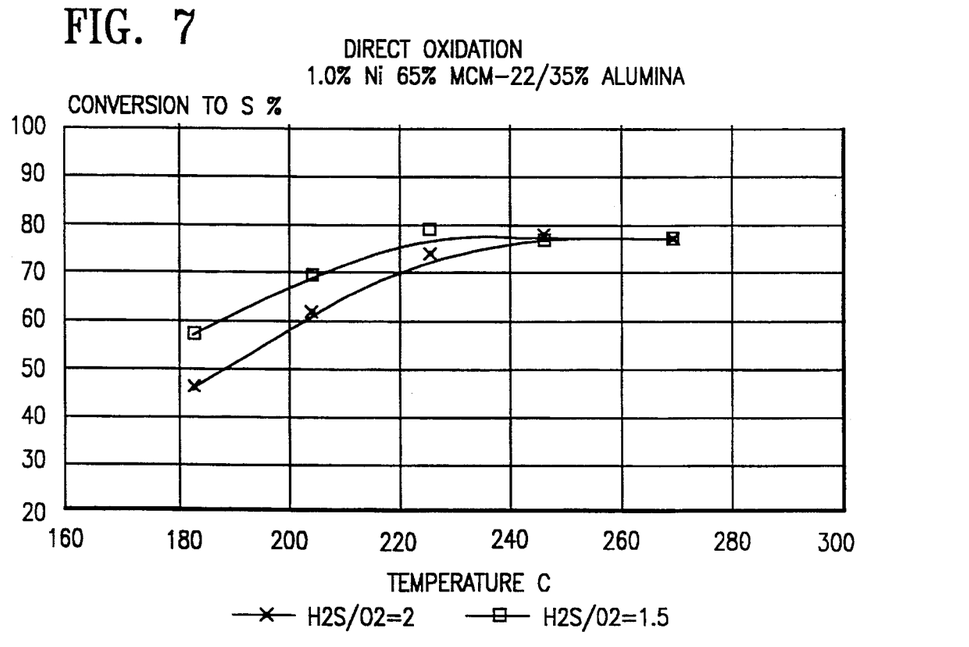
FIG. 7 is a graph of test data for a 1.0% Ni on 65% MCM-22/35% alumina for direct oxidation of hydrogen sulfide.
Figure 8:
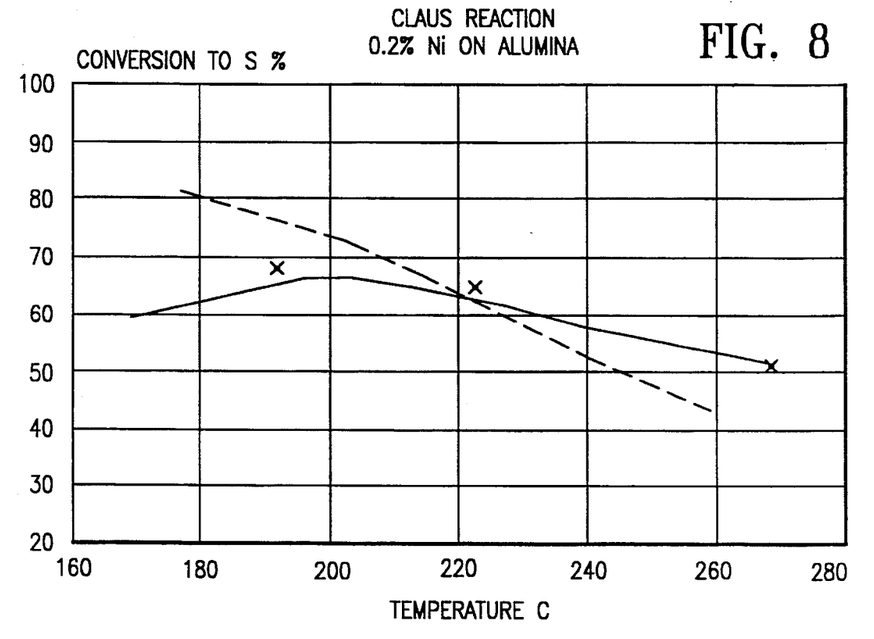
FIG. 8 is a graph of test data for a 0.2% Ni on alumina catalyst for a Claus reaction reduction of SOx by hydrogen sulfide to form elemental sulfur and water.
Figure 9:
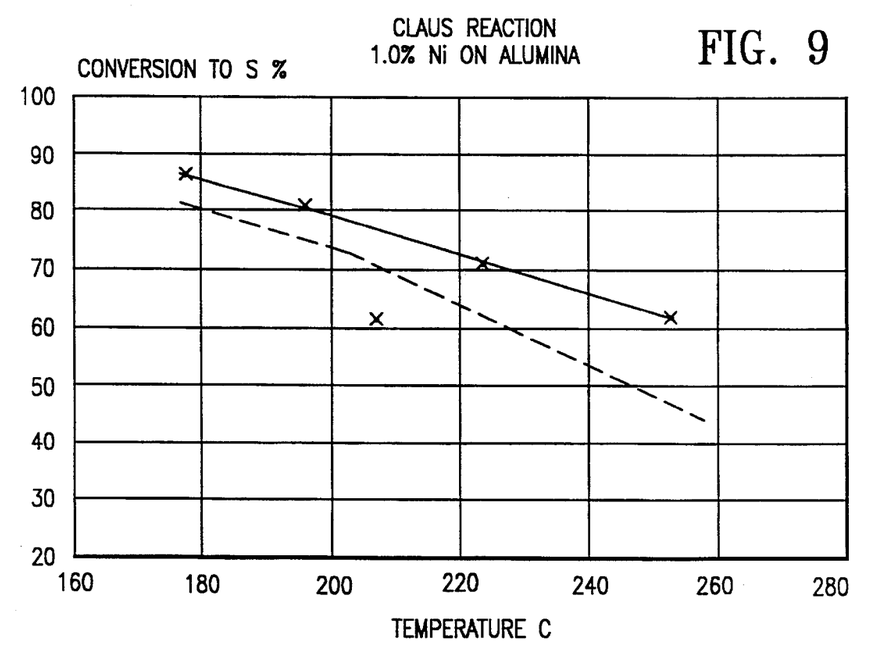
FIG. 9 is a graph of test data for a 1.0% Ni on alumina catalyst for a Claus reaction.
Figure 10:
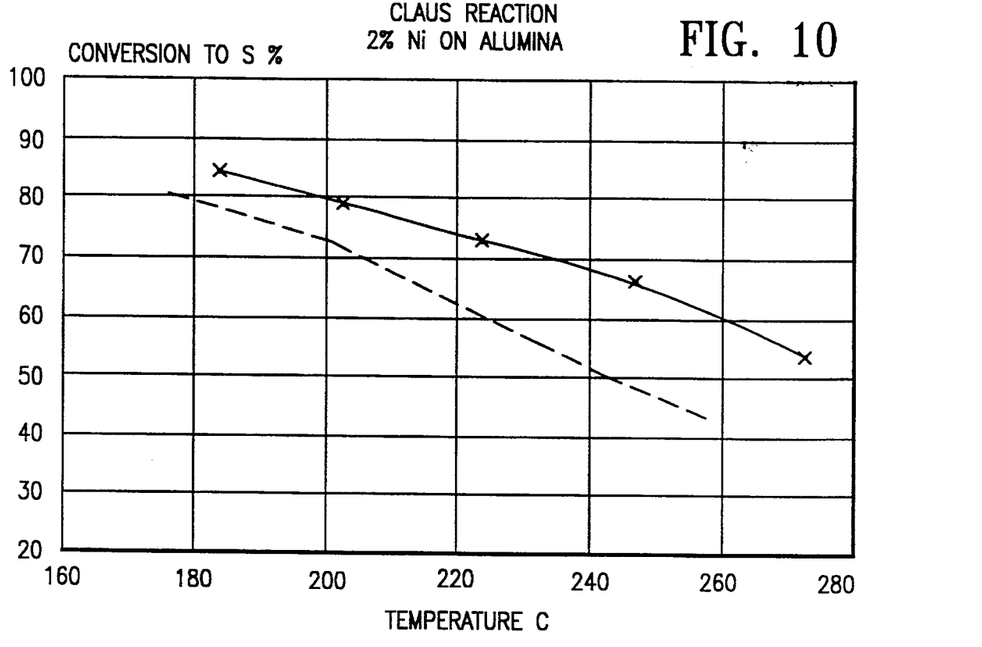
FIG. 10 is a graph of test data for a 2.0% Ni on alumina catalyst for a Claus reaction.
Figure 11:
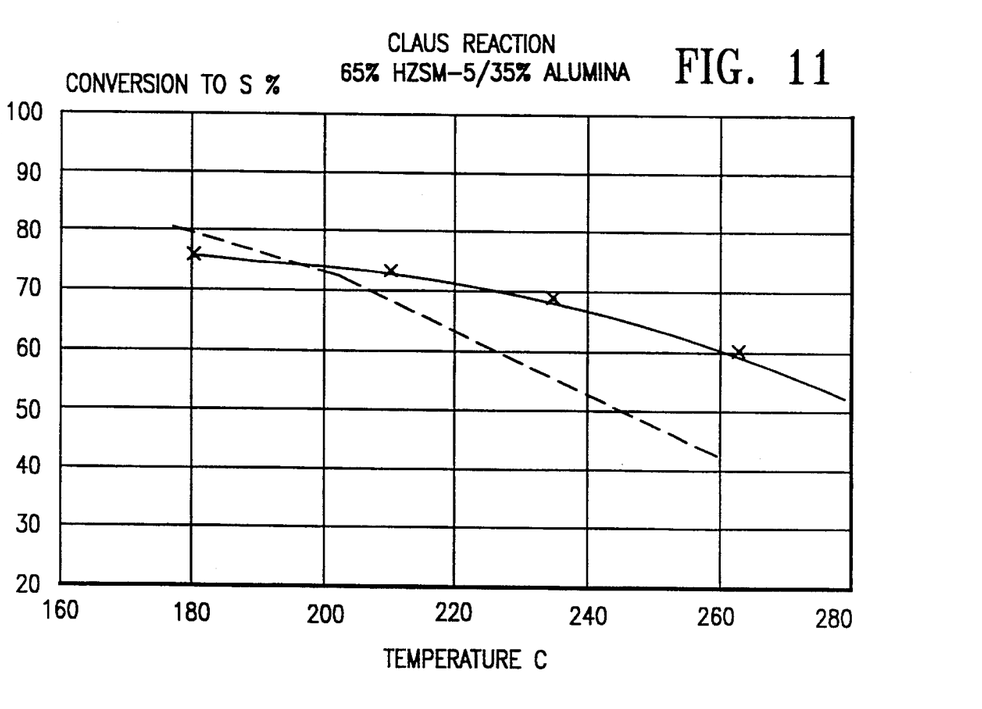
FIG. 11 is a graph of test data for a 65% HZSM-5/35% alumina catalyst for a Claus reaction.
Figure 12:
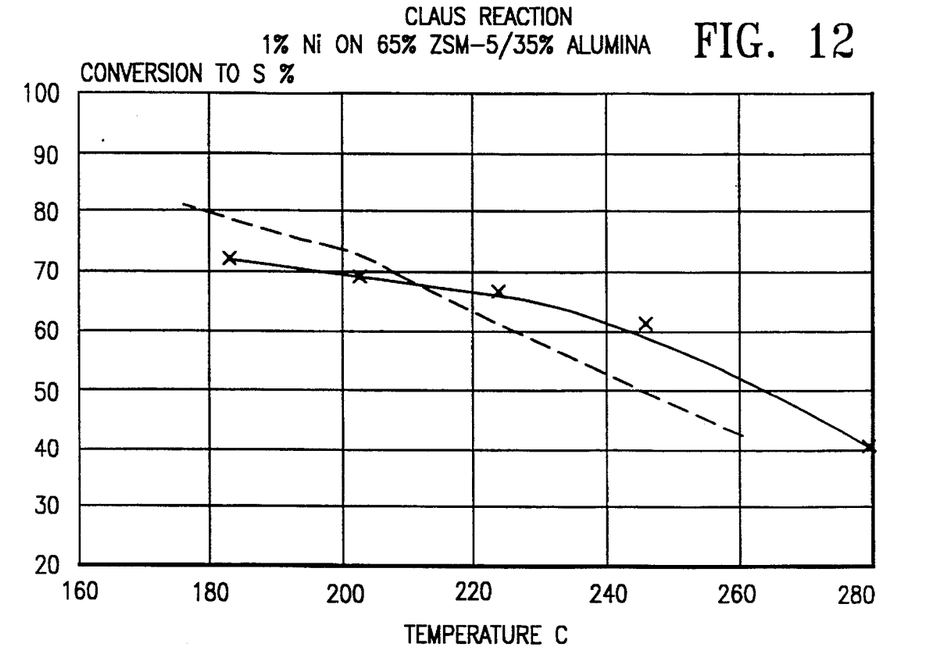
FIG. 12 is a graph of test data for a 1.0% Ni on 65% HZSM-5/35% alumina catalyst for a Claus reaction.
Figure 13:
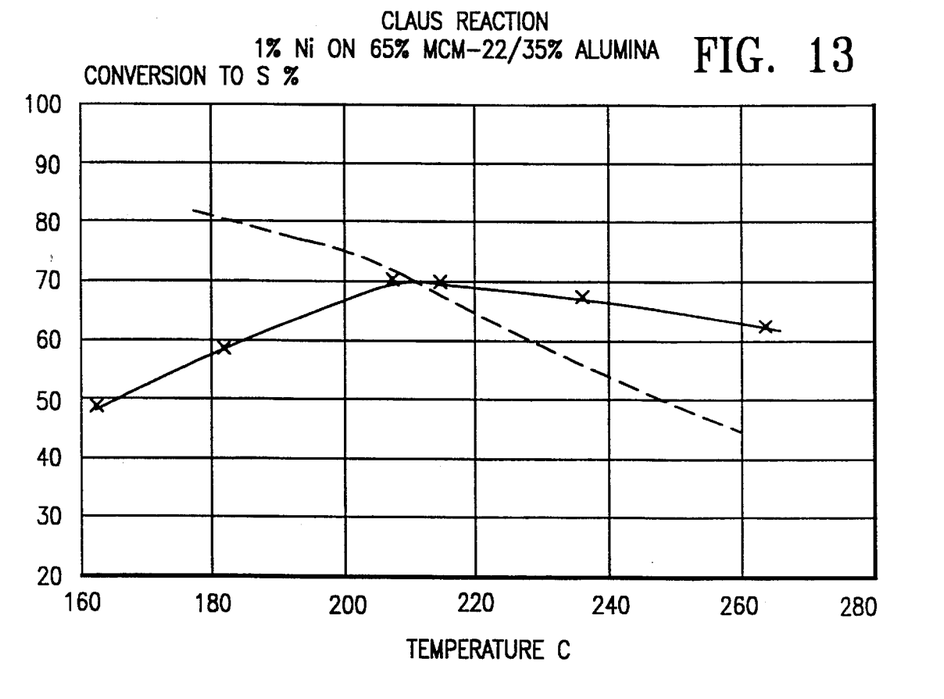
FIG. 13 is a graph of test data for a 1.0% Ni on 65% MCM-22/35% alumina for a Claus reaction.

With reference to the FIGs. 1A, 1B and 1C, a natural gas purification system 10 is shown as a single-train plant. However, the system typically would have multiple passes. A sour gas feed 11 flows at a pressure of approximately 1,100 psi (75 bar) through an absorption column 14 which is fitted with a plurality of trays 16. The gas flow in the absorption column 14 is counter to the flow of an absorption liquid 18, and emerges as clean gas in an overhead line 20. The enriched absorption liquid exits the column 14 by a line 22 and is supplied to a flash vessel 24. Due to a pressure reduction in the flash vessel 22, the methane absorbed with the absorption liquid is flashed with residues of $H_2S$ and $CO_2$. However, $H_2S$ and $CO_2$ are washed out of the flash gas by a flow 26 of the absorption liquid in a reabsorber 28 positioned on the flash vessel 24 leaving a hot cleaned gas stream 30 which may be used to heat a steam boiler not shown. The entire solvent quantity flows via a line 32 to a solvent/solvent heat exchanger 34 and into a regeneration column 36 that is also fitted with trays 38, with a connected heater 40. In the heater 40, the solvent is regenerated with vapor.

The Claus gas is released in the column 36, and comprises approximately equal proportions of $H_2S$ and $CO_2$. Depending on loading and absorption liquid circulation, heating vapor flow rates of 50 to 90 t per hour are required.

After cooling in the solvent/solvent heat exchanger 34, and an air and water cooler 42, regenerated absorption liquid is recirculated via a high-pressure pump 44 and the line 18 to the top inlet of the absorber 14, and via the line 26 to the reabsorber 28. The Claus gas is fed via an air cooler 46, a separator 48, and a line 51 to the Claus plant 50 where the sulfur compounds are converted to elemental sulfur.

The Claus gas in the line 51 typically has high concentrations of $H_2S$ and SOx, for example hydrogen sulfide concentrations of between 50% and 85% depending on plant and purification process. The Claus reaction is also limited to flue gases of relatively low hydrogen content. The Claus gas is fed to the combustion furnace chamber 52 of the Claus plant 50. The hydrogen sulfide is combusted therein with air until low concentrations of hydrogen sulfide and sulfur dioxide are detected at the outlet 49 of the combustion chamber 52. Approximately 65% of the hydrogen sulfide is typically converted to sulfur in the combustion chamber 52.

The reaction in the combustion chamber 52 generates a large amount of heat which is taken off in a heat exchanger portion 53 of a waste heat boiler 54 which generates steam. The steam may be used to drive a turbine to generate electricity. The elemental sulfur is removed by separator 55 and sent to a sulfur storage (not shown).

The remaining quantities of $H_2S/SO_2$ are fed to a first reactor 56 for conversion to elemental sulfur over a Claus catalyst such as bauxite, activated charcoal, and activated alumina.

In accordance with a preferred embodiment of this invention the Claus catalyst is an acid catalyst comprising a shape selective crystalline zeolite, a metal-exchanged or impregnated alumina or a mixture thereof. The preferred catalysts will be described in detail hereinafter.

The output of the first reactor 56 is fed to a second heat exchanger and waste heat boiler which functions in the same manner as the first unit 53,54 to separate out elemental sulfur, generate power and pass the remaining quantities of $H_2S/SO_2$ on to a second reactor 57 which reactor functions in the same manner as the first reactor 56. The effluent of the reactor 57 is passed to a third heat exchanger/waste boiler, separator and reactor stage 58. The output of the third stage 58 is passed to a waste heat boiler 59, and a elemental sulfur separator 100. The gaseous output of the reactor is sent to a heat exchanger 101 to raise the temperature thereof before the stream is sent to an incinerator 102 and a stack or chimney 103.

Generally, sour gas purification in Claus plants can remove up to 97% of the sulfur compounds from the Claus gas. However, recent conversion levels specified by some environmental agencies regulations are more severe. Thus, the need for Claus tail-gas cleaning. In accordance with the present invention, there is provided a direct oxidation system 60 for desulfurizing Claus tail-gas. The tail-gas from the separator 100 is first heated in a burner 62 before entry into a hydrogenation reactor 61. The burners used for this purpose should be suitable for soot-free substoichiometric combustion in order to ensure sufficient excess of $H_2$+CO. Then, all sulfur compounds in the tail-gas of the Claus plants are converted into hydrogen sulfide in the hydrogenation reactor 61, and the gas stream is then cooled. At this stage water is generated, and this is conditioned to be used as boiler-feed water. Then the gas is heated with a burner 70 in the direct oxidation section, and enough air 72 is added for the hydrogen sulfide to be converted to elemental sulfur in an oxidation reactor 74. The sulfur is separated in a downstream condenser 76, and the gas may be fed directly to an incinerator 80. The small residual amounts of sulfur compounds remaining in the gas are oxidized to $SO_2$ in the incinerator section 80. The combination of Claus plants with tail-gas cleaning units makes it possible to achieve a conversion in the order of 99.5%.

Cleaning tail gases from Claus plants in accordance with the present invention results in high-purity elemental sulfur as the end product. Further, the process of the invention avoids the prior art requirements for a process stage to convert all sulfur components to hydrogen sulfide or sulfur dioxide, and an absorption and a regeneration section whereby the $H_2S$ or $SO_2$ is returned to the Claus plant. High energy requirements of these prior art processes are primarily affected by the steam consumption to regenerate the rich absorption liquids.

As provided by the direct oxidation process of the present invention, a more favorable route from an energy stand point involves the exothermic reaction occurring completely in the gas phase:

$$2\ H_2S + O_2 \rightarrow 2/n\ S_n + 2\ H_2O;\ \Delta H = -315.1\ KJ,$$

wherein $\Delta H$ is heat of reactor.

Three conditions should be accomplished to reach the required high conversion in the gas phase. First, the carbon-containing sulfur compounds, which make up a major part of emission in many plants, must be converted. Second, the water vapor content should be as low as possible for reasons of reaction equilibrium. And third, the reaction must occur at a favorable temperature range (a lower temperature in the range is preferred), fast and with high selectivity. The faster the reaction, the less catalyst needed and consequently a smaller size reactor is required. A catalyst in accordance with an aspect of the present invention is provided for the third condition. As will be described more completely hereinafter, the catalyst is an acid catalyst comprising a shape selective crystalline zeolite, a metal-exchanged or impregnated alumina or a mixture thereof.

Hydrogen sulfide can be converted to elemental sulfur with the stoichiometric quantity of air, without any significant $SO_3$ formation or catalyst deactivation due to sulfation. However, oxygen addition can be varied from sub-to super-stoichiometric amounts. For example an oxygen to hydrogen sulfide ratio of from about 0.4 to about 0.7 will maintain conversion about 80%, with the stoichiometric ratio at about 0.5 giving the maximum conversion.

With $H_2S$ contents of about 1% by volume, which are common in the treatment of Claus tail gases, conversions of 70-95% $H_2S$ to sulfur can be achieved, depending on the $H_2S$ content, temperature and $H_2S/O_2$ ratio.

Optimum conversions can be achieved in a relatively wide range of temperatures and $H_2S/O_2$ ratios. With high $H_2S$ content, process control of direct oxidation in one isothermal reactor, or for example alternatively in two reactors with an intermediate sulfur condenser is possible.

As noted above, the soot-free substoichiometric combustion in the burner 61 ensures sufficient excess of $H_2+CO$ which in turn provides the following catalytic conversion of the sulfur components to $H_2S$.

The following reactions occur in the hydrogenation reactor 61 with for example a nickel/molybdenum or cobalt/molybdenum catalyst:

$$SO_2 + 3H_2 \rightarrow H_2S + 2H_2O$$

$$S + H_2 \rightarrow H_2S$$

$$COS + H_2O \rightarrow CO_2 + H_2S$$

$$CS_2 + H_2O \rightarrow CO_2 + 2H_2S$$

Carbon monoxide is likewise converted:

$$CO + H_2O \rightarrow CO_2 + H_2$$

At temperatures in the range of from about 260° C. to about 330° C. these reactions are virtually complete.

The process gas effluent of the hydrogenation reactor 61 is then cooled down in three stages. First a very useful process steam with a pressure of about 75 psi is generated in a waste-heat boiler 63. Further cooling takes place in a gas/gas heat exchanger 64, before the required final temperature is obtained in a quench column 65 by direct contact with cooled recycle water. Although the catalyst of the present invention is water tolerant, minimizing the amount of water is beneficial from a thermodynamic standpoint. Here the water vapor content of the gas may be reduced, for example, from about 10% to about 30% by volume to about 2% to about 4% by volume, corresponding to a dew point of from about 20° C. to about 30° C.

The $H_2S$-containing condensate is continually drawn off and is processed in a sour water stripper 66. The stripped water can serve to satisfy the plant requirements for boiler feed water.

The cooling section for reduction of the water content is followed by a tail gas clean-up stage. After admixture of air, the hydrogen sulfide is oxidized directly to elemental sulfur. This direct oxidation takes place at temperatures beginning at about 150° C. using an acid catalyst in accordance with the present invention. The required temperature is obtained by pre-heating the stream in the gas/gas heat exchanger 64, and subsequent heating in the burner 70.

Before entering the direct oxidation reactor 74, air 72 is added in a quantity such that an $H_2S/O_2$ ratio of 1.5/1 to 2/1 is obtained. In the oxidation reactor 74 the gas mixture then comes into contact with the acid catalyst. At preferred inlet temperatures of from about 150° C. to about 350° F. and space velocities from about 5 to about 2,000 GHSV, and preferably from about 700 to about 1,000 GHSV, direct conversions of $H_2S$ to sulfur and water vapor are possible with a yield of about 80% to about 90%. The sulfur is separated in the sulfur condenser 76.

In order to achieve maximum conversion, the reaction may be performed in two direct oxidation reactors each containing acid catalyst in accordance with the present invention. Before the first direct oxidation reactor 74, air is added in such an amount that oxygen is almost totally converted, and the gas after the reactor 74 contains only traces of $SO_2$ in addition to the unconverted excess $H_2S$. Downstream of the sulfur condenser 76, heating is provided by a further burner 77. Before the second direct oxidation reactor 78 it is again preferred to add approximate stoichiometric quantity of air for oxidation of the $H_2S$ that has not yet been converted. The degree of control provided is dependent on the process gas quantity and the $H_2S$ content after the first direct oxidation reactor 74. $H_2S$ conversion is continued in the second reactor 78 with further formation of elemental sulfur, which is separated in a second condenser 79.

An $H_2S$ conversion to elemental sulfur of more than 99.5% is achieved in a combination of Claus plant and direct oxidation process of the present invention. The quantities of $H_2S$ and sulfur vapor still remaining in the process gas are oxidized to $SO_2$ in the catalytic incinerator 80 operated at from about 300° C. to about 330° C. which is associated with a gas/gas heat exchanger 81 in order to reduce energy consumption.

Thus the invention provides catalytic oxidation by air to form elemental sulfur and water. The catalyst is a metal-exchanged alumina, or a hydrogen-form and/or metal-exchanged zeolite, or mixtures thereof. The exothermic reaction occurs at atmospheric pressure to about 300 psig, and at temperatures from between about 150° C. and about 350° C.

Whereas the Claus process 50 is used to convert $H_2S$ and $SOx$, typically at high concentrations, to elemental sulfur over a high alumina content catalyst, and the Claus reaction is limited to flue gases of low hydrocarbon content, this aspect of the present invention uses acid catalyst to directly oxidize low concentrations (equal or less than 1.0 wt %) of $H_2S$ to elemental sulfur and water. However, the present invention is not limit to low hydrocarbon streams having low concentrations.

EXAMPLES

OXIDATION OF HYDROGEN SULFIDE WITH AIR TO ELEMENTAL SULFUR

The zeolite and metal impregnated alumina catalysts listed in the following Table I were tested in a laboratory reactor using a 100 ml catalyst sample for each experiment, and a gas feed to the reactor of 81 l/hr. The gas to the reactor had the following composition:

| | | |
|---|---|---|
| $H_2S$ | 1.42 Vol. %, wet | 1.50 Vol. %, dry |
| $O_2$ | 0.47–0.94 Vol. %, wet | |
| $H_2O$ | 5.00 Vol. %, wet | |
| COS | 0.02 Vol. %, wet | |
| $N_2$ | 93.00 Vol. %, wet | |

Experimental data for each of the tested catalysts is plotted on a respective one of FIGS. 2–7, and shows the tested catalysts may be rated for desulfurizing by direct oxidation as stated in the following TABLE I.

TABLE I

| Catalyst Composition, Wt % | | | Desulfurization Potential | |
|---|---|---|---|---|
| | | | Low Temp | High Temp |
| Ni (%) | Zeolite (%) | $Al_2O_3$ (%) | Performance | Performance |
| 0.2 | — | 100 | M | S |
| 1.0 | — | 100 | G | G |
| 2.0 | — | 100 | G | G |
| — | 65 ZSM-5* | 35 | E | E |
| 1.0 | 65 ZSM-5 | 35 | S | G |
| 1.0 | 65 MCM-22 | 35 | — | S |

Temp. = Temperature; M = Moderate; S = Satisfactory; E = Excellent
*HZSM-5-Hydrogen form.

In the embodiment of the FIGS. 1A, 1B and 1C, a fixed bed of acid catalyst contemplated by this invention may be fed with a stoichiometric mixture of $H_2S$ and $O_2$ over which elemental sulfur and water would form. The operating conditions of the bed are adjusted based on the composition of the feed gas which is derived from natural gas production.

The invention also contemplates the use of a parallel flow catalyst in which a flue gas containing a significant amount of particulates flows through open channels parallel to the catalyst surface used to catalyze the direct oxidation of $H_2S$. The catalyst surface may be any one of known monolith structures wherein catalyst is coated on the interior surfaces, and the structure permits the particulate material to pass therethrough while insuring the gas contacts the catalyst surfaces. A suitable monolith structure is in the form of a honeycomb.

Important criteria in the design of the direct oxidation system 60 are the maintenance of low energy consumption and simplicity of process control. One direct oxidation reactor 74 is generally sufficient for cleaning up tail gases from 3-stage Claus plants. For 2-stage Claus plants, with correspondingly higher sulfur contents in the tail gas, the required total sulfur yield will determine whether the second oxidation reactor 78 is required.

Although described hereinabove with reference to Claus process tail-gas, this aspect of the invention is also useful for desulfurizing fuel gas and flue gases derived from coal or oil fired furnaces of refineries or boilers of electric utilities.

Apart from the clean-up of Claus tail gases, the direct oxidation process of the present invention is also suitable for direct sulfur recovery from other gas streams that have only a low $H_2S$ content and cannot be desulfurized in Claus plants. Further, the energy consumption of this process is considerably lower than that of other implemented processes with comparably high conversion levels.

In accordance with another aspect of the invention any one of the acid catalyst described herein may also be used in the reactors 56,57 of the Claus section 50 to carry out a Claus reaction for converting $H_2S$ and SOx (typically at high concentrations) to elemental sulfur and water.

In accordance with this aspect of the present invention, SOx is catalytically reduced by $H_2S$ to form elemental sulfur and water. The catalyst is a metal-exchanged alumina, or a hydrogen-form or metal-exchanged zeolite. The endothermic reaction occurs at from about atmospheric pressure to about 300 psi, and at a temperatures of between ambient and the kinetic limitation of about 600° F. The GHSV may be between about 1,000 and about 100,000, and preferably between about 30,000 to about 80,000.

The reaction of SOx with $H_2S$ proceeds according to the following reaction paths:

COS hydrolysis is also an important reaction to meet the total sulfur specifications in plant effluent gases and proceeds according to the following pathway:

The following examples are experiments conducted with a stoichiometric mixture of $SO_2$ and $H_2S$ at ambient conditions, and demonstrate that acid catalysts formed of shape selective zeolite, a metal-exchanged or impregnated alumina or a mixture thereof are very active for the Claus reaction. The results of these experiments are presented in FIGS. 8–13, and show the qualitative results for both the Claus and COS hydrolysis reactions. The solid lines are plots of data points, and the dashed lines are theoretical plots.

EXAMPLES

REDUCTION OF SOx BY HYDROGEN SULFIDE TO ELEMENTAL SULFUR

The zeolite and metal impregnated alumina catalysts listed in the following Table II were tested in a laboratory reactor using a 100 ml catalyst sample for each experiment, and a gas feed to the reactor of 109 l/hr. The gas to the reactor had the following composition:

| | | |
|---|---|---|
| $H_2S$ | 0.75 Vol. %, wet | 1.00 Vol, %, dry |
| $SO_2$ | 0.38 Vol. %, wet | 0.50 |
| $H_2O$ | 25.00 Vol. %, wet | |
| COS | 0.01 Vol. %, wet | |
| $CO_2$ | 34.00 Vol. %, wet | |
| $N_2$ | 40.00 Vol. %, wet | |

Experimental data for each of the tested catalyst is plotted an a respective one of FIGS. 8–13, and shows the catalysts rated for reduction of SOx by hydrogen sulfide as stated in the following Table II.

TABLE II

| Catalyst | Claus Potential | | COS Conversion | |
| --- | --- | --- | --- | --- |
| | "Low" Temp. Perf. | "High" Temp. Perf. | "Low" Temp. Perf. | High Temp. Perf. |
| 0.2% Ni on Alumina, AL$_2$O$_3$ | Mod. | Sat. | Mod. | Sat. |
| 1.0% Ni on Alumina | Exc. | Exc. | Exc. | Exc. |
| 2.0% Ni on Alumina | Exc. | Exc. | Exc. | Exc. |
| 65% HZSM-5/35% Alumina | Good | Exc. | Good | Exc. |
| 1.0% Ni 65/35 ZSM-5/ Alumina | — | Good | — | — |
| 1.0% Ni 65/35 MCM-22/ Alumina | — | Sat. | — | Mod. |

Temp. = Temperature; Perf. = Performance; Mod. = Moderate; Sat. = Satisfactory; Exc. = Excellent Improved Claus catalysts through the use of metal-exchanged alumina or metal-exchanged zeolite catalysts offers an attractive alternative to liquid scrubbing or other solid bed technologies from a capital investment, operability, operating cost and/or environmental standpoint. This technology can also be applied to natural gas, fuel gas and tail gas treating as well as flue gases derived from coal or oil fired furnaces of refineries or boilers of electric utilities.

In one embodiment of this aspect, a fixed bed of zeolite catalyst is fed with a stoichiometric mixture of SOx and H$_2$S over which elemental sulfur and water would form. The operating conditions of the bed are modified based on the composition of the feed gas. This feed gas may be derived from a hydrocarbon rich or oxygen rich stream, i.e., fuel gas or flue gas derived.

In another embodiment, the use of a parallel flow catalyst in which a flue gas containing a significant amount of particulates flows through open channels parallel to the catalyst surface used to catalyze the Claus reaction. The catalyst surface may be any one of known monolith structures wherein catalyst is coated on the interior surfaces, and permits the particulate material to pass therethrough while insuring the gas contacts the catalyst surfaces. A suitable monolith structure is in the form of a honeycomb.

The acidic catalyst used in both the desulfurization and Claus aspects of the present invention is preferably a zeolite-based catalyst, that is, it comprises an acidic zeolite in combination with a binder or matrix material such as alumina, silica, or silica-alumina. The acidic catalyst may have a pore size in the range of from about 5 angstroms to about 7 angstroms, a silica-to-alumina ratio of at least 12, a constraint index of from about 1 to about 12, and a significant Bronsted acid activity. The preferred zeolites for use in the catalysts in the present process are the medium pore size zeolites, especially those having the structure of ZSM-5, ZSM-11, ZSM-12, ZSM-22, ZSM-23, ZSM-35, ZSM-48 or MCM-22. The medium pore size zeolites are a well-recognized class of zeolites and can be characterized as having a Constraint Index of 1 to 12. Constraint Index is determined as described in U.S. Pat. No. 4,016,218 incorporated herein by reference. Catalysts of this type are described in U.S. Pat. Nos. 4,827,069 and 4,992,607 which are incorporated herein by reference and to which reference is made for further details of such catalysts, zeolites and binder or matrix materials.

The desulfurization and Claus aspects of the present invention may also use catalysts based on large pore size zeolites such as the synthetic faujasites, especially zeolite Y, preferably in the form of zeolite USY. Zeolite beta may also be used as the zeolite component. Other materials of acidic functionality which may be used in the catalyst include the materials identified as MCM-36 (described in U.S. patent application Ser. No. 07/811,360, filed 20 Dec. 1991) now U.S. Pat. No. 5,250,277, issued Oct. 5, 1993, and MCM-49 (described in U.S. Pat. No. 5,236,575). The application and the patent describing MCM-36 and MCM-49, respectively, are incorporated herein by reference.

If the catalyst is used in a fluidized bed the particle size of the catalyst should be selected in accordance with the fluidization regime which is used in the process. Particle size distribution will be important for maintaining turbulent fluid bed conditions as described in U.S. Pat. No. 4,827,069 and incorporated herein by reference. Suitable particle sizes and distributions for operation of dense fluid bed and transport bed reaction zones are described in U.S. Pat. Nos. 4,827,069 and 4,992,607 both incorporated herein by reference. Particle sizes in both cases will normally be in the range of 10 to 300 microns, typically from 20 to 100 microns.

Thus, the preferred acidic zeolite catalysts are those exhibiting high hydrogen transfer activity and having a zeolite structure of ZSM-5, ZSM-11, ZSM-12, ZSM-22, ZSM-23, ZSM-35, ZSM-48, MCM-22, MCM-36, and MCM-49.

ZSM-5 crystalline structure is readily recognized by its X-ray diffraction pattern, which is described in U.S. Pat. No. 3,702,866. ZSM-11 is disclosed in U.S. Pat. No. 3,709,979, ZSM-12 is disclosed in U.S. Pat. No. 4,810,357, ZSM-22 is disclosed in U.S. Pat. No. 4,810,357, ZSM-23 is disclosed in U.S. Pat. Nos. 4,076,842 and 4,104,151, ZSM-35 is disclosed in U.S. Pat. No. 4,016,245, ZSM-48 is disclosed in U.S. Pat. No. 4,375,573 and MCM-22 is disclosed in U.S. Pat. No. 4,954,325. The U.S. Patent identified in this paragraph are incorporated herein by reference.

While suitable zeolites having a silica to alumina molar ratio of 20:1 to 200:1 or higher may be used, it is advantageous to employ aluminosilicate ZSM-5 having a silica:alumina molar ratio of about 25:1 to 70:1, suitably modified. A typical zeolite catalyst component having Bronsted acid sites may consist essentially of crystalline aluminosilicate having the structure of ZSM-5 zeolite with 5 to 95 wt. % silica, clay and/or alumina binder.

These siliceous zeolites are employed in their acid forms, ion-exchanged or impregnated with one or more suitable metals, such as Ga, Pd, Zn, Ni, Co and/or other metals of Periodic Groups III to VIII. The zeolite may include other components, generally one or more metals of group IB, IIB, IIIB, VA, VIA or VIIIA of the Periodic Table (IUPAC).

The catalyst materials may include two or more catalytic components which components may be present in admixture or combined in a unitary multifunctional solid particle.

In addition to the preferred aluminosilicates, the gallosilicate, ferrosilicate and "silicalite" materials may be employed. Zeolites, such as ZSM-5, are particularly useful in the process because of their regenerability, long life and stability under the extreme conditions of operation. Usually the zeolite crystals have a crystal size from about 0.01 to over 2 microns or more, with 0.02–1 micron being preferred.

In a fixed bed embodiment the catalyst may consist of a standard 70:1 aluminosilicate H-ZSM-5 extrudate having an acid value of at least 20, preferably 150 or higher.

While the invention has been described in conjunction with specific embodiments thereof, it is evident that many alternatives, modifications, and variations will be apparent to those skilled in the art in light of the foregoing description. Accordingly, it is intended to embrace all such alternatives, modification, and variations as fall within the spirit and broad scope of the appended claims.

What is claimed is:

1. A process for reducing sulfur content in a gaseous stream with the production of elemental sulfur comprising the steps of:
   treating the gaseous stream by hydrogenation and hydrolysis to convert at least substantially all of the sulfur components therein to hydrogen sulfide;
   then reducing the water content of the gaseous stream to thereby increase sulfur production;
   introducing enough oxygen into the gaseous stream to allow conversion of hydrogen sulfide to elemental sulfur;
   contacting the gaseous stream in an oxidation reactor with an acidic catalyst at a temperature of about 150° C. to about 350° C. in such manner that a reaction consisting essentially of the gas phase direct conversion of hydrogen sulfide to elemental sulfur and water vapor occurs; said contacting being conducted in such manner that sulfur dioxide is produced in only trace amounts; said acidic catalyst being a hydrogen form zeolite or a nickel-impregnated or exchanged zeolite said zeolite having a structure of ZSM-5, ZSM-11, ZSM-12, ZSM-22, ZSM-23, ZSM-35, ZSM-48, MCM-22 or mixtures thereof and said zeolite having a pore size in the range of from about 5 angstroms to about 7 angstroms, a silica-to-alumina ratio of at least 12, a constraint index of from about 1 to about 12, and a significant Bronsted acid activity or a mixture thereof; and
   cooling the product gas after it leaves the oxidation reactor to separate elemental sulfur by condensation.

2. The process of claim 1 wherein gaseous stream has from about 5 to about 2,000 GHSV in said reactor.

3. The process of claim 2 wherein said gaseous stream has from about 700 to about 1,000 GHSV.

4. The process of claim 1 wherein said gaseous stream is a tail-gas from a Claus process.

5. The process of claim 4 wherein said Claus process comprises contacting in a Claus reactor a gaseous stream comprising hydrogen sulfide, carbon oxysulfide and sulfur dioxide with an acidic catalyst at a temperature of from about ambient to about 600° C., in such manner that substantial conversion of hydrogen sulfide and sulfur oxides to elemental sulfur and water and hydrolysis of carbon oxysulfide occurs, the acidic catalyst in said Claus reactor being selected from the group consisting of hydrogen form or nickel-exchanged or impregnated zeolites ZSM-5, ZSM-11, ZSM-12, ZSM-22, ZSM-23, ZSM-35, ZSM-48, MCM-22, zeolite beta, MCM-36, and MCM-49 or a mixture thereof.

6. The process of claim 5 wherein the zeolite in said Claus reactor has a pore size in the range of from about 5 angstroms to about 7 angstroms, a silica-to-alumina ratio of at least 12, a constraint index of from about 1 to about 12, and a significant Bronsted acid activity.

7. The process of claim 5 wherein the gaseous stream in said Claus reactor contains as sulfur compounds $H_2S$, $SO_2$, COS, $CS_2$, $CH_3SH_3$, sulfur vapor or any combination thereof.

8. The process of claim 5 wherein the gaseous stream in said Claus reactor has from about 1,000 GHSV to about 100,000 GHSV.

9. The process of claim 8 wherein the gaseous stream in said Claus reactor has from about 30,000 GHSV to about 80,000 GHSV.

10. The process of claim 5 wherein the acidic catalyst consists essentially of the hydrogen form or the nickel-exchanged or impregnated zeolites ZSM-5, ZSM-11, ZSM-12, ZSM-22, ZSM-23, ZSM-35, ZSM-48, MCM-22, zeolite beta, MCM-36, and MCM-49.

11. The process of claim 1 wherein conversion of 70 to 95% of the hydrogen sulfide present in the gaseous stream to elemental sulfur occurs.

12. The process of claim 1 wherein enough oxygen is introduced into the gaseous stream to produce a ratio of oxygen to hydrogen sulfide of about 0.4 to about 0.7.

13. The process of claim 1 wherein the gaseous stream that is contacted with the acid catalyst in the oxidation reactor comprises less than 1 wt. % hydrogen sulfide.

14. The process of claim 1 wherein the nickel-exchanged or impregnated zeolite is exchanged or impregnated with at least one Group VIII metal other than nickel.

15. The process of claim 1 wherein the acid catalyst comprises ZSM-5 having a silica:alumina molar ratio of about 25:1 to 70:1.

16. The process of claim 1 wherein the acid catalyst comprises MCM-22.

17. The process of claim 1 wherein the acidic catalyst consists essentially of the hydrogen form zeolite or the nickel-exchanged or impregnated zeolite.

* * * * *